Dec. 16, 1952     B. E. LUBOSHEZ     2,621,572
FILM PROCESSING MACHINE

Filed Dec. 27, 1948     2 SHEETS—SHEET 1

INVENTOR.
BENJAMIN E. LUBOSHEZ
BY Newton M. Perrino
Frank R. Gollon
ATTORNEYS

Dec. 16, 1952     B. E. LUBOSHEZ     2,621,572
FILM PROCESSING MACHINE

Filed Dec. 27, 1948     2 SHEETS—SHEET 2

INVENTOR.
BENJAMIN E. LUBOSHEZ
BY Newton M. Perrum
Frank R. Gollon
ATTORNEYS

Patented Dec. 16, 1952

2,621,572

UNITED STATES PATENT OFFICE 2,621,572

FILM PROCESSING MACHINE

Benjamin E. Luboshez, Rochester, N. Y., assignor to Eastman Kodak Company, Rochester, N. Y., a corporation of New Jersey Application December 27, 1948, Serial No. 67,467

13 Claims. (Cl. 95—90.5)

1

The present invention relates to a processing machine for photographic film and more particularly to a machine adapted to process strip film, such as 16 mm. or 35 mm. or any other standard film. It further relates to an apparatus which, although adaptable for ordinary processing, is primarily designed for high-temperature, rapid processing. It still further relates to a film drive and to an automatic winding device which are singularly well adapted for use in such a processing apparatus, as is herein disclosed. Another application of applicant's novel film drive is disclosed in United States Patent No. 2,496,947, granted to him February 7, 1950, for a Film Processing Machine with Film Operated Control Means for a Fluid Applicator.

Two common defects of many high-temperature processing machines have resulted from the problem of providing efficient agitation of the processing solutions and the problem of avoiding oxidation of the developing solution which is enhanced by any process which requires the use of heated solutions. Both of these are believed to be overcome in applicant's particular apparatus. They are met by spraying or forcing small quantities of the heated processing solutions against the emulsion side of the film as it is passed through the length of the treatment chambers. For this purpose, simple rotary pumps are provided close to the film, the solutions being heated in small quantities within the pumps themselves, the temperatures being thermostatically controlled. In this manner, heating of the main bodies of the processing solutions is avoided to reduce materially the degree of oxidation thereof. The used solutions fall to the bottom of the chambers where they may be drained and rejected.

In addition, the herein-described apparatus includes several novel features which add to the simplicity of operation and maintenance. The method of transporting the film is particularly adapted for use in the apparatus, cooperating with applicant's specific spray mechanism to provide a novel and effective processing machine, advantages of which will be apparent from the following description. The machine incorporates devices, too, which enable the various operations to be carried out automatically in full daylight. For this purpose there is a daylight-loading device, an enclosed light-tight film track, automatic regulating devices, and an automatic film winding device. A flushing system is also incorporated to facilitate cleaning of the spray pumps and those elements of the film drive and others

2 which are exposed to the corrosive and contaminative effects of the processing fluids.

It is, therefore, an object of this invention to provide an improved processing machine.

It is a further object of this invention to provide an improved processing machine which is especially adapted for high temperature processing.

It is a still further object of this invention to provide an improved processing machine which is highly automatic in its operation and which may be operated in full daylight.

It is a still further object of this invention to provide a processing apparatus which is equipped with simple and effective means for cleaning the various elements thereof which are subjected to the corrosive and contaminative action of the processing fluids.

It is a still further object to provide a novel and effective film conveyor which is especially adapted to the rapid processing of photographic films.

It is a still further object to provide a film winding or takeup device which is automatic in its operation.

Other objects and advantages of the invention will become apparent from the following description taken in connection with the accompanying drawings, and it will be understood that many changes may be made in the details of construction and arrangement of parts shown and described without departing from the spirit of the invention as expressed in the accompanying claims. I, therefore, do not wish to be limited to the exact details shown and described, as the preferred form only has been shown by way of illustration.

Figure 1:
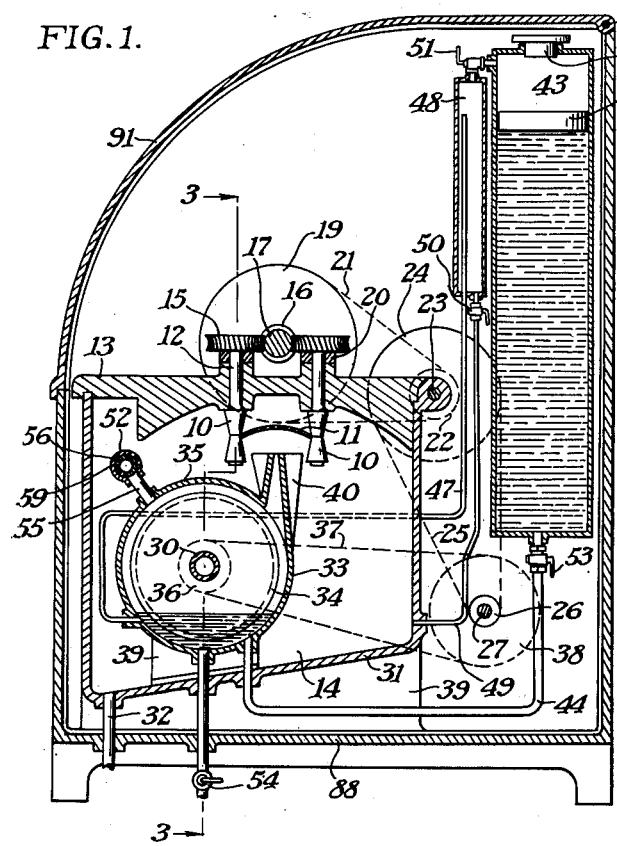
Fig. 1 is a diagrammatic view, in section, of an apparatus embodying the invention, taken through one of the fluid treatment chambers and the processing fluid reservoir.
Figure 3:
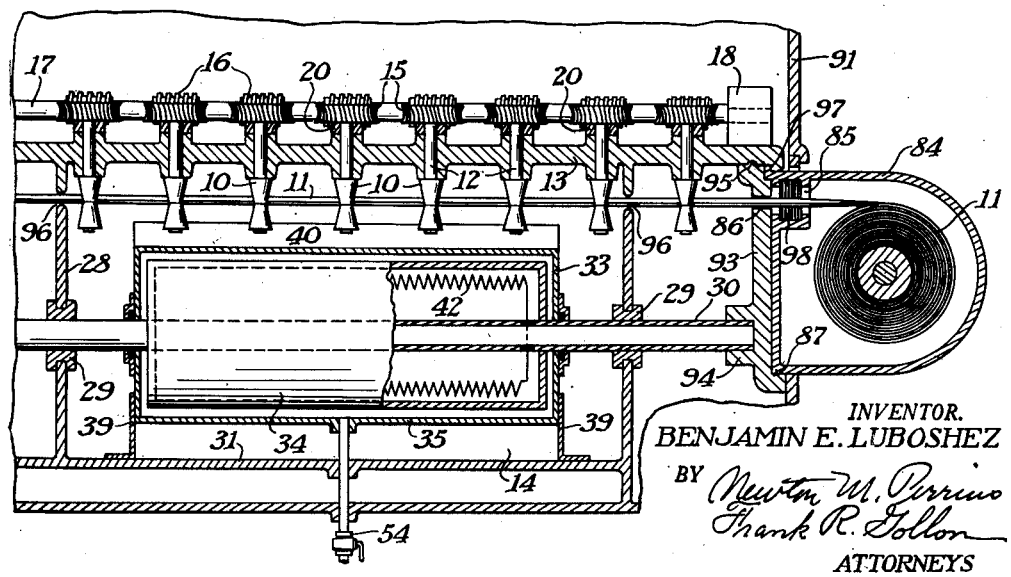
Fig. 3 is a sectional view of the apparatus taken on the line 3—3 of Fig. 1, omitting the fluid storage reservoir and connecting tubes.

The film conveying means, like that disclosed in applicant's copending application, above referred to, includes the rollers 10 arranged in pairs along the path of travel of the film 11. These rollers have reduced portions of less diameter than the remaining portions thereof and, as illustrated in the drawings, may take the shape of an hour glass, although obviously other configurations are possible. Each pair of rollers is so spaced that the distance between the reduced portions thereof is less than the width of the film band 11. The rollers 10 are mounted upon spaced shafts 12 which extend through the cover 13 of the processing chambers or tanks 14, the rollers being thereby suspended within the chambers as shown in Figs. 1 and 3. The opposite ends of the shafts 12 mount the worm gears 15 which mesh with the worms 16 pinned upon the shaft 17. Each pair of rollers, thus rotated in opposite directions by the worm gears and worm, functions to bow and grip the film strip therebetween and draw the film through the apparatus. While the film strip is illustrated as being bowed upwardly, there is no reason why the film may not be bowed downwardly instead.

The shaft 17 journalled in bearings 18 has a pulley 19 secured thereon by which the shaft 17 may be driven. The individual collars 20 on the shafts 12, which maintain these shafts, the worm gears and rollers in correct position and relative alignment, may be formed of an oil impregnated material; they may, in fact, be formed integrally with the worm gears 15. The pulley 19 is connected by the belt 21 to a driving pulley 22, the latter being mounted coaxially with hinge pivot 23 of the cover 13 in order that the cover may be raised for inspection purposes without disturbing the driving mechanism. A driven pulley 24, also mounted coaxially with the hinge pivot, is connected by belt 25 with pulley 26 on the main motor shaft 27.

It may here be noted that this method of transporting the film, although involving a large number of identical rollers and worm gears, may be constructed quite inexpensively. The worm gears 15 need not be made with any great precision and, in fact, ordinary stamped-out gears will ordinarily suffice. There is practically no load upon these gears and the wear on them is negligible. While the worms 16 have been described above as separate elements pinned upon the shaft 17, a fairly thick rod having a screw thread cut therein will also serve the purpose. Since there is little load upon these elements, only infrequent lubrication of these parts will be necessary.

Figure 2:
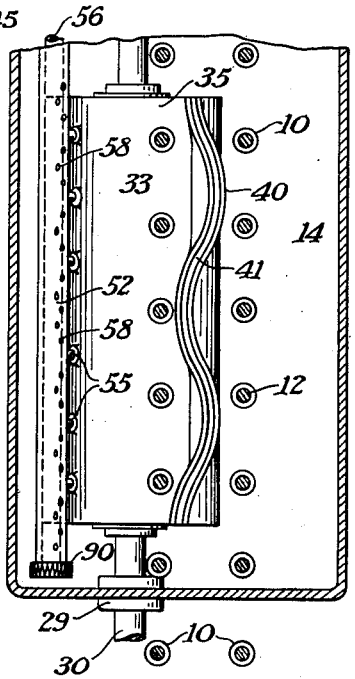
Fig. 2 is a top view of one of the rotary pumps in a treatment chamber.

The processing machine comprises several successive compartments or chambers each similar to the chamber 14 and separated from each other by the walls 28. The walls 28 provide means for mounting the bearings 29 for the tubular pump shaft 30 which extends therethrough. The various compartments which serve the various processing operations, rinsing and washing, are all essentially identical except that they may vary in their respective lengths. Since the film moves through each chamber at the same rate, the time during which each operation is conducted is proportional to the length of the chamber in which the operation takes place. Ordinarily, the various operations will require different lengths of time. Again, the number of compartments will depend upon the particular method of processing to be used. Thus, for ordinary purposes there will be four such fluid treatment chambers, the first of which would be devoted to development, the second, a shorter compartment, to rinsing, the third to fixing, and the fourth, the longest, to washing. For combined developing and fixing systems as few as two chambers will suffice. Figs. 1 to 3 illustrate in diagrammatic form but a single one of the chambers.

Each chamber or tank 14 is provided with a sloping base 31 and a drain pipe 32 which allow the used processing liquids and wash water to drain therefrom. The hinged cover 13 is preferably so formed that it extends the length of the several compartments, cooperating with the side walls 28 to define narrow slots 86 at each end of each compartment for the passage of the film. The slots are of sufficient size to permit the film to readily pass therethrough, yet small enough to prevent the solution in one tank from splashing over into another. Although not strictly necessary (nor illustrated in the drawings), the slots may be lined with a soft, resilient material to wipe the film as it passes from one chamber to the other.

Each compartment contains a rotary pump 33 whose function is to spray a processing solution or wash water against the underside of the bowed film as it travels, emulsion side down, the length of the jet 40. This is clearly illustrated in Figs. 1 to 3. The pump 33 includes the rotor 34 mounted in the pump housing 35. The several rotors are all mounted upon the pump shaft 30 which is driven by the pulley 36 on the shaft 30, this pulley being connected by the belt 37 to a driving pulley 38 mounted upon the main motor shaft 27. The several pulleys, which drive the film conveying rollers 10 and the pump rotors 34, are so proportioned that the rotors are rotated at the correct speed in relation to the film travel. Although not shown, conventional speed regulating devices may be employed in order that each speed may be varied independently of the other to accommodae the apparatus to different types of film emulsions and processing solutions.

The surface of each rotor 34 is preferably roughened, as by corrugations or striations, to facilitate its carrying or spinning the liquid as it rotates within the housing. The housing or casing 35 surrounding each rotor is freely mounted on the rotor shaft 30 and is fixed relative to the chamber 14 by means of the angle brackets 39. The discharge nozzle or jet 40 extends the length of the pump housing in the direction of travel of the film and is positioned to spray upwardly against the emulsion-coated underside of the film. In order that the spray may reach equally all portions of the surface of the film, the nozzle aperture takes the form of a sinusoidal slot 41 as clearly seen in Fig. 2. Thus, in operation when the rotor is spun at the required speed, the liquid in the bottom of the casing is picked up by the rotor and sprayed equally against every part of the emulsion side of the film. The liquid is heated in the housing 35 by heating elements in the body of the rotor 34 itself. These are preferably heating coils 42, the connecting wires thereto passing through insulated openings into the tubular shaft 30 and along the shaft to slip-ring connections at either end of the shaft. Instead of heating coils I may circulate hot water or steam through the hollow shaft and hollow rotors. Still another method which I may use to heat the processing fluid within the pump housing 35 is to pass heating coils around the external surface of the housing or even enclose the housing in a jacket through which hot water or steam is circulated. In that case, the rotor may be less massive and may take the form of a series of slightly separated discs mounted upon the shaft 30 or it might even take the form of a long rotating wire brush. Such devices may, however, result in an increase of aeration of the developer which is obviously bad from the standpoint of increased oxidation and I, therefore, prefer to use the corrugated or striated drum disclosed above. While not illustrated, I may locate a thermostatic control in or adjacent the pump nozzle 40, whereby the fluid temperature may be automatically regulated. By heating the relatively small quantity of liquid in the pump housing just before application upon the film rather than by heating the reservoir of fluid which feeds into the housing, I obtain all of advantages of high temperature processing without the attendant disadvantage of increasing the rate of deterioration or spoiling of the processing fluid by increased oxidation thereof caused by heating of the reservoir of fluid.

Solutions are fed into the pump housing from the reservoir 43 by means of the tube 44. A valve 53 in this tube is normally open when the apparatus is in use. To prevent to some extent oxidation at the surface of the developer solution in the reservoir, a float 45 is provided. In addition, a stopper 46 in the top of the reservoir serves as a substantially hermetic seal. In order to maintain the liquid in the housing 35 automatically at its correct level a hydrostatic device is employed. Alternatively, a float chamber with needle-valve control may be used, but the hydrostatic method has the advantage of requiring no moving parts. In the device employed, a second tube 47 opens into the pump housing 35 at the required liquid level, the other and upper end opening into a trap 48. This trap consists of a transparent tube of somewhat large diameter whose function is to catch any liquid that may be sucked up the tube 47 and prevent it from entering the reservoir 43. At the bottom of the trap is an outlet tube 49 through which any accumulated liquid can be drained off into the chamber 14 when the valve 50 is opened for that purpose. However, in order to permit the liquid to flow out of the trap, air must be allowed to enter. This is made possible by the three-way valve 51 which in one position establishes communication between the trap 48 and the outside air and in the other position between the trap 48 and the reservoir 43. The latter is the normal position during processing and in no position of the valve 51 is the outside air permitted to enter the reservoir directly. When the fluid level in the pump housing drops sufficiently to uncover the entrance of pipe 47 therein, air enters the pipe 47, flows into the trap 48 and thence into the reservoir 43 through the valve 51, whereupon liquid will flow out of the reservoir through tube 44 into the housing 35 until the liquid level is reestablished covering the entrance into tube 47. The flow of air into the tube 47 being thus discontinued, the flow of additional liquid from the reservoir is automatically stopped. It should be noted that this particular arrangement has the additional advantage over the more simple structure, where a single tube might be run from the bottom of the reservoir to an entrance into the pump housing at the desired level of fluid therein, in that the air from the housing, when the said entrance is uncovered, will not bubble up through the body of fluid in the reservoir with the resultant agitation and oxidation thereof.

For cleaning purposes a flushing tube 52 extends parallel to the rotor shaft 30, there being at intervals small connecting pipes 55 extending between the tube 52 and the pump housing 35. When the processing operations have been completed, the valve 53 is closed, as well as the valve 51 opening into the top of the reservoir. The valved drain 54 from the bottom of housing is opened and with the rotor running water is caused to flow through the flushing tube 52 and into the housing 35 through the connecting pipes 55. This operation thoroughly cleanses the pump housing, rotor and nozzle. To more effectively clean the film conveying means, including the rollers 10 and the underside of the cover 13 mounting the conveyor, small holes 58 are strategically located in the tube 52, through which some of the water flowing through the tube will issue to spray the said film conveying means and cover 13. In order that the processing fluids will not be forced by the rotor up through the pipes 55 into the flushing tube 52, means are provided to close off these entrances when the apparatus is being used to process film. This means comprises a tube 56, snugly and rotatably mounted in the tube 52, having openings 59 therein which are so located that in one position of rotation they register with the connecting pipes 55 and the small holes 58. In a second position the tube 56 obstructs or closes off the said connecting pipes and holes. Thus, when film is to be processed, the tube 56 is rotated by means of a knurled hand knob 90 to this second position whereby no processing fluid will be forced by the rotor into the flushing tube.

Figure 4:
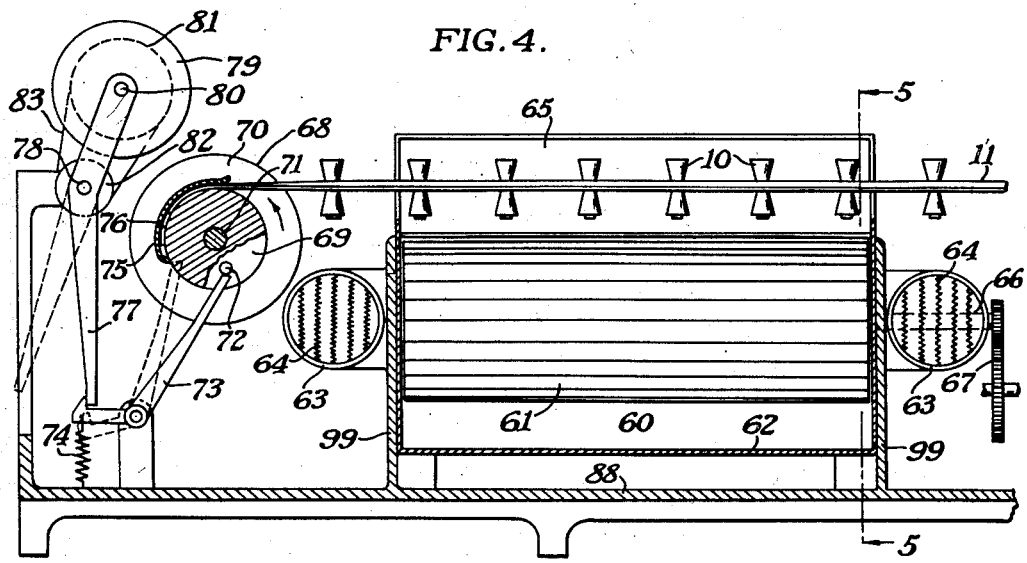
Fig. 4 is a side view of a portion of the machine, illustrating the drying unit and the automatic film winding device, parts of which are shown in section.
Figure 5:
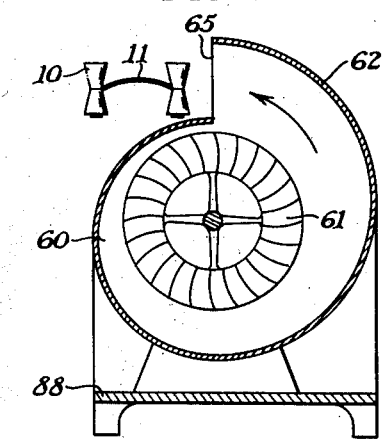
Fig. 5 is a sectional view through the drier taken on the line 5—5 of Fig. 4.
Figure 6:
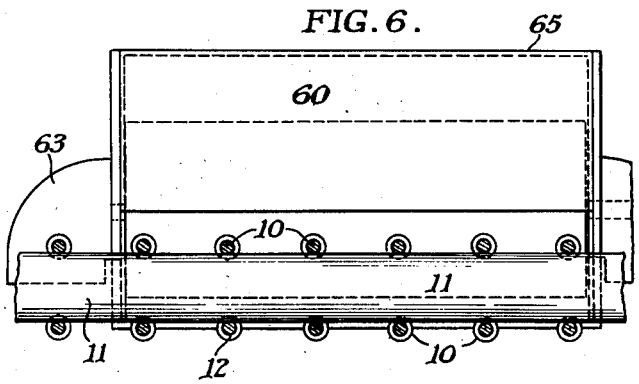
Fig. 6 is a top view of the drier showing its position relative to the film conveying means.

After passing through the last of the fluid treatment chambers, the film is ready for drying. The drying unit in my apparatus comprises the centrifugal blower 60 with bladed rotor 61 mounted in casing 62. Each axial air intake 63 is provided with electric coils 64 whose function is to warm the air which is being blown across the film as it travels through the apparatus. The air outlet 65 extends in the direction of travel of the film as illustrated in Figs. 4 to 6. The rotor 61 is powered by the same motor which drives the film and rotates the pump rotors. The blower shaft 66 is not continuous with the pump rotor shaft 30, since the blower is driven at a much greater speed than that of the pump rotors. Accordingly, shafts 66 and 30 are connected through a gear train 67 designed to cause the shaft 66 to rotate at a predetermined greater R. P. M. than shaft 30. The blower is supported upon the base 88 between the upright plates 99 which are integral with said base. The length of the blower 60 is such that substantially complete drying of the film is effected by the time it passes beyond the end of the air outlet 65. The film is carried past the blower by the conveyor which is essentially a continuation of the conveyor means shown in Fig. 3. The rollers, worm gears and worm shaft thereof may be mounted upon a plate (not shown) which is in alignment with the element 13. This plate may, in fact, be integral with the cover element 13 or, preferably, a separate support fixedly aligned with the element 13 when the latter is in its lowered or operative position.

Alternatively, or in addition to the above drying unit, a series of infrared lamps may be positioned along the course of travel of the film after it leaves the last of the processing chambers. Should these supplement the blower, the latter may, of course, be of considerable smaller capacity than otherwise.

After being dried, the film is ready to be wound upon the takeup device 68 which, as will be hereinafter disclosed, is set in motion by operation of the film itself. The device 68 includes the core 69 and one or more flanges 70 which may be detachably secured or fixedly secured to the core. The core 69 may have a spindle 71 integral therewith which is freely rotatable in bearings or, alternatively, may be rotatable about a fixed spindle. A projection or roller 72 is mounted upon the takeup device, as shown in Fig. 4, and functions to restrain the counterclockwise rotation of lever 73 which is urged by the spring 74. While the projection 72 is illustrated in Fig. 4 as being secured directly to the core 69, it must be realized that it could just as well be attached to a flange of the takeup device. The core 69 is fitted with means 75 which, in effect, produces a slot 76 in the peripheral surface of the core, which is closed at one end and open at the other to receive the film end as it leaves the last of the pairs of the driving rollers 10. Upon entering the slot 76, the film tip continues to the end of the slot, whereupon continued movement of the film starts the takeup device rotating in a counterclockwise direction. This so operates, since the straight portion of the film is bowed, and, hence, rigid, and the curved portion of the film is confined within the slot 76. Immediately upon rotation, the projection 72 releases the lever 73 which is rotated counterclockwise by the action of spring 74, thereby freeing the lever 77 which rotates about the pivot 78 under the influence of the unbalanced weight of the elements attached to the other end of lever 77 above the pivot 78. One of these elements is the large rubber-covered roller 79 which rotates about the axis 80 and is driven by a pulley 81 from the pulley 82 through the belt 83. The pulley 82 is coaxial with the pivot 78, whereby the drive through belt 83 is operative whatever the orientation of the upper portion of lever 77 about the pivot 78. The pulley 82 is driven continuously, preferably by the main motor which drives the film conveyor means, the pump rotors and the blower rotor. The speed with which this pulley is rotated is such that the peripheral speed of the roller 79 is slightly in excess of the linear speed of the film through the machine. Thus, when the lever 77 has been tripped, as described above, the roller 79 falls upon the initial film convolution upon the takeup core and the film continues to be wound upon the core 69 under the influence of the rotating roller 79 until all of the film has passed through the processing apparatus. An automatic switch may be provided to stop the machine when the processing and winding of the film has been completed. Such a switch may be actuated by a photoelectric mechanism or pressure device bearing against the film edge, positioned just beyond the drier unit, both of which are commonplace in the art. This method of winding the film upon the takeup device is thus entirely automatic and only requires correct setting of the takeup mechanism at the start of operations. Since the peripheral speed of the roller 79 is slightly greater than the linear speed of the film, there will conceivably be some little slippage between the roller and the film, but, inasmuch as the emulsion coating is on the underside of the film, no damage to the film is caused thereby.

The several treatment chambers 14, the film conveying mechanism thereon and the fluid control apparatus are preferably all enclosed as a unit in an outer casing 91, the cover of which is hinged at 92 so that it can be swung upwards out of the way when desired. A plate 93 secured at each end of the casing 91 provides bearings 94 for the ends of the pump rotor shaft. The cover 13 which forms a unitary closure for all of the compartments 14, as seen in Fig. 3, cooperates with the plates 93, as at 95, to further insure the light-tightness of the processing apparatus. The plate 93 at one end of the machine is further indented to receive and support the film magazine 84 for daylight loading. The film magazine which contains the roll of film 11 for processing includes an opening 85 lined with velvet-covered pads 96 of resilient material to prevent light from entering the magazine. This lined opening provides an arched slot for the passage of the film to transversely bow the film to lend rigidity thereto for inserting the film end into the machine through slot 86 and between the first pair of rollers 10. In placing the magazine in position, after inserting about two inches of film into the machine and between the first pair of rollers, a lip 97 on the top edge of the magazine is hooked into the recess between the cover 13 and plate 93, as seen in Fig. 3, and the magazine then pushed down until it rests against the outer surface of the plate 93 and in the recess and on the shelf 87 provided by the indented plate 93.

By performing the various processing operations in the closed casing 91, the whole is performed under light-tight conditions. As an added precaution, the inner surfaces of the casing 91 and the outer surfaces of the processing chambers 14 are preferably provided with a dull black, non-reflecting surface. The base 88 of the casing 91 is extended to form the support for the motor (not shown) and the drying unit and takeup device as illustrated in Fig. 4. Although these latter units are not enclosed in a casing as are the processing chambers, they could readily be so.

While the above device is especially adapted to processing motion picture film, it obviously is adaptable to the processing of strips of roll film or even individual sheets. From the foregoing description, it will be apparent that I have provided means for obtaining all of the objects and advantages of this invention.

What I claim and desire to secure by Letters Patent of the United States is:

1. In a film processing apparatus having a tank and conveyor means for moving a film through said tank, a rotary pump adapted to be positioned within the tank, said pump including a housing, a rotor within the housing, a nozzle for spraying a processing fluid contained in the housing upon the film, and a heating element adapted to preheat the fluid within the housing, conduit means for feeding the processing fluid into the pump housing, and control means for automatically maintaining substantially constant the fluid level in said housing.

2. In a film processing apparatus having a tank and conveyor means for moving a film through said tank, a rotary pump adapted to be positioned within the tank, said pump including a housing, a rotor within the housing, a heating element within the rotor, and a nozzle having an elongated discharge aperture for spraying a processing fluid contained in the housing upon the film, a reservoir for holding the processing fluid, conduit means for feeding the fluid from the reservoir to the pump housing, and control means for maintaining a substantially constant fluid level in said housing.

3. In a film processing apparatus having a tank and conveyor means for moving a film linearly through said tank, an elongated rotary pump adapted to be positioned within the tank, said pump including a housing, a rotor within the housing, and a spray nozzle having an elongated sinusoidal discharge aperture, which elongated aperture is adapted to extend in the direction of travel of the film through the tank, whereby an entire surface of the film will be sprayed as it traverses the length of the aperture.

4. In a film processing apparatus having a tank and a conveyor for moving a film linearly through said tank, a rotary pump adapted to be positioned within the tank, said pump including a housing, a rotor within the housing, a nozzle having an elongated sinusoidal discharge aperture which is adapted to extend in the direction of travel of the film through the tank for spraying a processing fluid contained in the housing upon the emulsion side of the film, and a heating element adapted to preheat the fluid within the housing, and means to maintain a substantially constant fluid level in said pump housing.

5. In a film processing apparatus having a tank and a conveyor for moving a film linearly through said tank, a spray mechanism adapted to be positioned within the tank, said mechanism including a housing, a rotor within the housing, a heating element within the rotor, and a nozzle having an elongated sinusoidal discharge aperture which is adapted to extend in the direction of travel of the film through the tank for spraying a processing fluid contained in the housing upon the emulsion side of the film, a supply reservoir for holding the processing fluid, conduit means connecting said reservoir with said spray mechanism housing, and control means for automatically maintaining a substantially constant fluid level in the housing.

6. In a film processing apparatus, a tank, conveyor means mounted within the tank for moving a film therethrough, a rotary pump within the tank, said pump including a housing, a rotor within the housing, and a nozzle so positioned relative to the conveyor means to direct a spray of processing fluid from the pump upon the emulsion side of the film, conduit means for feeding processing fluid into the pump housing, a pipe connected at spaced points by passages to the pump housing, means for connecting a source of cleaning fluid to said pipe, said pipe having a series of apertures therein adapted to direct a spray of cleaning fluid from said pipe upon said conveyor means, and drainage means for draining said tank and pump housing.

7. In a film processing apparatus, a tank having a hinged cover, conveyor means mounted upon said cover and extending into the tank for moving a film therethrough, drive means for said conveyor means including a driven and a driving pulley coaxial with the cover hinge, and a spray mechanism in said tank adapted to spray the emulsion side of the film as it is moved through the tank by the conveyor means.

8. In a film processing apparatus, a tank having a hinged cover, film conveyor means mounted upon said cover and extending into the tank for moving a film therethrough, drive means for said conveyor means including a driven and a driving pulley coaxial with the cover hinge, a rotary pump within the tank, said pump including a housing, a rotor within the housing, and a nozzle adapted to spray the emulsion side of the film as it is moved through the tank by the conveyor means, a pipe connected at spaced points by passages to the pump housing, and means for connecting a source of cleaning fluid to said pipe, said pipe having a series of apertures therein adapted to direct a spray of cleaning fluid from said pipe upon said conveyor means extending into the tank.

9. In a film processing apparatus, a tank having a hinged cover, conveyor means mounted upon said cover and extending into the tank for moving a film therethrough, drive means for said conveyor means including a driven and a driving pulley coaxial with the cover hinge, a rotary pump within the tank, said pump including a housing, a rotor within the housing, a nozzle adapted to direct a spray of processing fluid from the pump housing upon the emulsion side of the film as it travels through said tank, and a heating element adapted to preheat the fluid within the housing, and conduit means for feeding the processing fluid into the pump housing.

10. In a film processing apparatus, a tank having a hinged cover, conveyor means mounted upon the cover comprising a plurality of pairs of spaced rollers on shafts extending into said tank, each roller having a portion of reduced diameter for engaging a film edge and each pair of rollers being so spaced that a film passing therebetween is bowed transversely between the reduced portions, means for rotating said rollers to drive the film through the tank in a path defined by the rollers including a driven and a driving pulley coaxial with the cover hinge, and a spray mechanism in said tank adapted to spray the emulsion side of the film as it is driven through the tank by said rollers.

11. In a film processing apparatus, a tank, conveyor means for passing a film through the tank comprising a plurality of pairs of spaced rollers, each roller having a portion of reduced diameter for engaging a film edge and each pair of rollers being so spaced that a film passing therebetween is bowed transversely between the reduced portions, means for rotating said rollers to drive the film through the tank in a path defined by the rollers, and a spray mechanism in the tank adapted to spray the emulsion side of the film as it is driven through the tank, said mechanism including an elongated sinusoidal discharge aperture, which elongated aperture extends in the direction of travel of the film through the tank, whereby the entire emulsion side of the film will be sprayed as it traverses the length of the aperture.

12. In a film processing apparatus, a tank, conveyor means for passing a film through the tank comprising a plurality of pairs of spaced rollers, each roller having a portion of reduced diameter for engaging a film edge and each pair of rollers being so spaced that a film passing therebetween is bowed transversely between the reduced portions, means for rotating the rollers to drive the film through the tank in a path defined by the rollers, a rotary pump within the tank, said pump including a housing, a rotor within the housing, a nozzle having an elongated discharge aperture which extends in the direction of travel of the film through the tank, and a heating element adapted to preheat the processing fluid within the housing, and means to maintain a substantially constant fluid level in said pump housing.

13. In a film processing apparatus, a tank, a cover hinged thereto, conveyor means mounted upon said cover having a plurality of pairs of spaced shafts extending into the tank, rollers mounted on said shafts within the tank, each roller having a portion of reduced diameter for engaging a film edge and each pair of rollers being so spaced that a film passing therebetween is bowed transversely between the reduced portions, means for rotating said shafts and rollers to drive the film through the tank in a path defined by the rollers including a driven and a driving pulley coaxial with the cover hinge, a spray mechanism in said tank adapted to spray the emulsion side of said film as it is driven through the tank, said mechanism comprising a housing, a rotor within the housing, a heating element within the rotor, and a nozzle extending from said housing and adapted to direct a spray of processing fluid upon the film.

BENJAMIN E. LUBOSHEZ.

REFERENCES CITED

The following references are of record in the file of this patent:

UNITED STATES PATENTS

| Number | Name | Date |
| --- | --- | --- |
| 1,565,931 | Haley | Dec. 15, 1925 |
| 1,728,361 | Pifer | Sept. 17, 1929 |
| 1,998,154 | Burns | Apr. 16, 1935 |
| 2,218,656 | Pifer | Oct. 22, 1940 |
| 2,342,000 | Leshing et al. | Feb. 15, 1944 |
| 2,371,073 | Smith, Jr. | Mar. 6, 1945 |
| 2,401,185 | Pratt et al. | May 28, 1946 |